US011390691B2

(12) United States Patent
Ikeda et al.

(10) Patent No.: US 11,390,691 B2
(45) Date of Patent: Jul. 19, 2022

(54) OLIGOSACCHARIDE POWDER AND METHOD FOR MANUFACTURING SAME

(71) Applicant: KABUSHIKI KAISHA YAKULT HONSHA, Tokyo (JP)

(72) Inventors: Masakazu Ikeda, Tokyo (JP); Ryo Aoki, Tokyo (JP); Masahiko Ito, Tokyo (JP)

(73) Assignee: KABUSHIKI KAISHA YAKULT HONSHA, Tokyo (JP)

( * ) Notice: Subject to any disclaimer, the term of this patent is extended or adjusted under 35 U.S.C. 154(b) by 0 days.

(21) Appl. No.: 16/616,762

(22) PCT Filed: May 23, 2018

(86) PCT No.: PCT/JP2018/019744
§ 371 (c)(1),
(2) Date: Nov. 25, 2019

(87) PCT Pub. No.: WO2018/216707
PCT Pub. Date: Nov. 29, 2018

(65) Prior Publication Data
US 2020/0102404 A1 Apr. 2, 2020

(30) Foreign Application Priority Data
May 26, 2017 (JP) .............................. JP2017-104686

(51) Int. Cl.
*C08B 30/00* (2006.01)
*C08B 30/18* (2006.01)
*C08B 30/06* (2006.01)

(52) U.S. Cl.
CPC .............. *C08B 30/18* (2013.01); *C08B 30/06* (2013.01)

(58) Field of Classification Search
None
See application file for complete search history.

(56) References Cited

U.S. PATENT DOCUMENTS

| | | | |
|---|---|---|---|
| 3,821,433 A * | 6/1974 | Mitchell et al. .......... | A23F 5/40 426/592 |
| 5,087,461 A | 2/1992 | Levine et al. | |
| 5,139,575 A | 8/1992 | Matsuda et al. | |
| 2007/0048432 A1 * | 3/2007 | Holzgraefe ............ | A23K 50/60 426/658 |
| 2013/0171204 A1 * | 7/2013 | DuBourdieu .......... | A23K 40/25 424/400 |
| 2015/0305394 A1 * | 10/2015 | Mazer ..................... | A23P 10/22 426/61 |
| 2016/0183584 A1 * | 6/2016 | Naganuma ................ | A23L 2/54 426/540 |
| 2016/0255849 A1 * | 9/2016 | Diekhaus ................. | A23G 9/32 |

FOREIGN PATENT DOCUMENTS

| | | | |
|---|---|---|---|
| CN | 104207144 | 12/2014 | |
| CN | 104397311 A * | 3/2015 | ............... A23G 9/52 |
| EP | 0535627 A1 * | 4/1993 | ............... A23G 9/52 |
| EP | 0646326 A1 * | 4/1995 | ............. A23L 27/32 |
| EP | 1988096 | 11/2008 | |
| JP | 55-104885 | 8/1980 | |
| JP | 57-129667 | 8/1982 | |
| JP | 4-30773 | 2/1992 | |
| JP | 4-71500 | 3/1992 | |
| JP | 2014-93946 | 5/2014 | |
| WO | 2012/155227 | 11/2012 | |
| WO | WO-2014057954 A1 * | 4/2014 | ............... A23L 2/54 |
| WO | WO-2015073843 A1 * | 5/2015 | ............. A23L 33/40 |
| WO | 2016/052721 | 4/2016 | |

OTHER PUBLICATIONS

WO 2014057954, English translation (Year: 2014).*
CN104397311A—English translation (Year: 2015).*
Nakajima, Takehiro, "*Application of Maltodextrin toFfoods*", New Food Industry, vol. 26, No. 12, 1984, pp. 17-21, in particular, p. 18, lower right column, p. 20, left column, lines 1-4 from the bottom.
Official Communication issued in International Patent Application No. PCT/JP2018/019744, dated Aug. 21, 2018.
Search Report in corresponding Singapore Application No. 11201910881W, dated Mar. 10, 2021.
Piyachomwan et al., "Comparative Study on Compositional and Functional Properties of Cassava- and Corn-Based Maltodextrin," *Żywność Nauka Technologia Jakość. Suplement*, Dec. 31, 2002, vol. 4, No. 33, pp. 198-208.

* cited by examiner

*Primary Examiner* — Stefanie J Cohen
(74) *Attorney, Agent, or Firm* — Greenblum & Bernstein, P.L.C.

(57) ABSTRACT

Provided are: an oligosaccharide powder having high working properties, the oligosaccharide powder being characterized by containing a dextrin having a dextrose equivalent of 10 to 18 and an oligosaccharide; and a method for manufacturing the same.

10 Claims, No Drawings

OLIGOSACCHARIDE POWDER AND METHOD FOR MANUFACTURING SAME

FIELD OF INVENTION

The present invention relates to an oligosaccharide powder and a method for manufacturing the same.

BACKGROUND ART

Oligosaccharides are obtained by using a saccharide, such as a monosaccharide, a disaccharide, or a polysaccharide, as a raw material and allowing an enzyme or the like to act on the saccharide or subjecting the saccharide to hydrolysis or the like. In an oligosaccharide, 2 to 10, preferably 2 to 5 saccharides are bound. Such oligosaccharides have health promoting effects including an effect of improving fecal conditions and an effect of promoting proliferation of *Lactobacillus bifidus*, and thus are incorporated in various foods and drinks (PTL 1).

The product forms of oligosaccharides include liquid and powder. In a known method, a guar gum or the like is mixed and dissolved in an oligosaccharide-containing syrup and the mixture is made into a powder form by a spray drying method (PTL 2).

Unfortunately, an oligosaccharide powder obtained by the above method has high hydroscopic properties and thus is poor in working properties. In particular, under conditions of high temperature and high humidity, lumps are solidified unless the oligosaccharide powder is quickly used after taken out of a container, leading to very poor working properties.

CITATION LIST

Patent Literature

[PTL 1] JP-A-55-104885
[PTL 2] JP-A-4-30773

SUMMARY OF INVENTION

Technical Problem

Accordingly, an object of the present invention is to provide an oligosaccharide powder having low hydroscopic properties and high working properties and a method for manufacturing the same.

Solution to Problem

As a result of intensive studies for achieving the above object, the present inventors have found that when a dextrin having a dextrose equivalent (DE) in a specific range is used in drying, the resulting powder has low hydroscopic properties and high working properties, completing the present invention. The present inventors have also found that this method achieves a high recovery rate of an oligosaccharide powder, completing the present invention.

Specifically, the present invention relates to an oligosaccharide powder characterized by containing a dextrin having a dextrose equivalent of 10 to 18 and an oligosaccharide.

The present invention also relates to the oligosaccharide powder that is obtained by preparing a solution that contains a dextrin having a dextrose equivalent of 10 to 18 and an oligosaccharide and subjecting the solution to drying.

The present invention further relates to a method for manufacturing an oligosaccharide powder, the method being characterized by including: preparing a solution that contains a dextrin having a dextrose equivalent of 10 to 18 and an oligosaccharide; and subjecting the solution to drying.

Advantageous Effects of Invention

The oligosaccharide powder of the present invention has lower hydroscopic properties than conventional ones and thus has higher working properties.

In addition, the method for manufacturing an oligosaccharide powder of the present invention is a method that achieves a high recovery rate of an oligosaccharide powder and thus provides small waste of resources.

DESCRIPTION OF EMBODIMENTS

The oligosaccharide powder of the present invention is a powder that contains a dextrin having a dextrose equivalent of 10 to 18 and an oligosaccharide.

The dextrin having a dextrose equivalent of 10 to 18 contained in the oligosaccharide powder of the present invention refers to a dextrin that has a dextrose equivalent of 10 to 18 (DE) as measured by Somogyi Nelson Method (Non-patent Literature 1: *Seibutsu Kagaku Jikkenho* (Experimental Method of Biochemistry) (*Kangen-tou no Teiryo-ho* (Quantification of Reduced Sugar)), Gakkai Shuppan Center (1969)). One of such dextrins may be used alone or two or more thereof may be used in combination. Among the dextrins, a dextrin having a dextrose equivalent of 10 to 13 is preferably used. It has not been heretofore known that an oligosaccharide powder having low hydroscopic properties and high working properties is obtained when an oligosaccharide powder is manufactured using a dextrin having a low dextrose equivalent.

The content of the dextrin having a dextrose equivalent of 10 to 18 in the oligosaccharide powder of the present invention is, for example, but not limited to, 35 to 80% by mass (hereinafter referred to simply as "%"), preferably 40 to 60%, more preferably 44 to 60%, and further preferably 44 to 50%.

In addition, the oligosaccharide contained in the oligosaccharide powder of the present invention is, for example, an oligosaccharide that is obtained by using a saccharide, such as a monosaccharide, a disaccharide, or a polysaccharide, as a raw material and allowing an enzyme or the like to act on the saccharide or subjecting the saccharide to hydrolysis or the like, and in which oligosaccharide, 2 to 10 saccharides and preferably 2 to 5 saccharides are bound. Examples of specific oligosaccharides include a galactooligosaccharide, an isomaltooligosaccharide, a xylooligosaccharide, a soybean oligosaccharide, a nigerooligosaccharide, a lactosucrose, and a fructooligosaccharide. One of such oligosaccharides can be used alone or two or more thereof can be used in combination. Among such oligosaccharides, galactooligosaccharide is preferred. The galactooligosaccharide for use in the present invention is not limited as long as it is an oligosaccharide that contains 2 to 8 saccharides and that has in the molecular thereof one or more molecules of a galactose. Examples include a oligosaccharide having three or more saccharides represented by the general formula: Gal-(Gal)n-Glc (wherein Gal represents a galactose residue, Glc represents a glucose residue, and n represents an integer of 1 to 6) and a galactosyl disaccharide, such as Gal-Gal or an isomer of lactose. One of the oligosaccharides may be used alone or two or more thereof may be used in combination. Examples of binding modes in the oligosaccharide include, but not limited to, β1-6, β1-3, β1-4, β1-2, α1-3, and α1-6 binds. In the general formula, n is preferably 1 to 4 and particularly preferably 1 to 2. Examples of galactooligosaccharides having three saccharides include Galβ1-4Galβ1-4Glc, Galβ1-4Galβ1-3Glc, and Galβ1-6Galβ1-4Glc. An Example of galactooligosaccharides having four saccharides is Galβ1-6Galβ1-4Galβ1-4Glc. The galactooligosaccharide for use in the present invention is particularly preferably a galactooligosaccharide that contains, as a main component, 4'-galactosyllactose (Galβ1-4Galβ1-4Glc) obtained by allowing β-galactosidase to act on lactose.

The content of the oligosaccharide in the oligosaccharide powder of the present invention is for example, but not limited to, 10 to 60%, preferably 20 to 35%, more preferably 22 to 30.8%, and further preferably 27.5 to 30.8%.

In the oligosaccharide powder of the present invention, the blending ratio of the oligosaccharide to the dextrin having a dextrose equivalent of 10 to 18 is, for example, but not limited to, 1:1 to 1:8, preferably 1:1.4 to 1:4, more preferably 1:1.4 to 1:2.7, and further preferably 1:1.4 to 1:1.8.

Furthermore, in the oligosaccharide powder of the present invention, another component, such as a mineral, may be contained as long as it does not impair the effects of the present invention.

The oligosaccharide powder of the present invention described above has low hydroscopic properties and thus has high working properties. Accordingly, the oligosaccharide powder of the present invention is such an oligosaccharide powder that, even when used under conditions of high temperature and high humidity, for example, under a condition of a room temperature of 30° C. and a humidity of 60%, lumps are not generated for 60 to 75 minutes after taken out from a container, or lumps, if generated, become powder by a strong push with a scoopula and thus enabling use as an oligosaccharide powder.

The method for manufacturing the oligosaccharide powder of the present invention is not limit as long as it can manufacture such a powder as described above that contains a dextrin having a dextrose equivalent of 10 to 18 and an oligosaccharide, and examples thereof include a method including mixing a powder of a dextrin having a dextrose equivalent of 10 to 18, an oligosaccharide powder, and, as needed, a powder of another component (hereinafter referred to as a "mixing method") and a method including preparing a solution that contains a dextrin having a dextrose equivalent of 10 to 18 and an oligosaccharide and subjecting the solution to drying (hereinafter referred to as a "drying method"). Among the manufacturing methods, a drying method is preferred since an oligosaccharide powder having low hydroscopic properties is obtained Examples of powders of a dextrin having a dextrose equivalent of 10 to 18 for use in the mixing method, among the methods for manufacturing the oligosaccharide powder of the present invention, include products commercially available as Dextrin #100 (DE=10 to 13: Sandec series manufactured by Sanwa Starch Co. Ltd.) and Dextrin #150 (DE=15 to 18: Sandec series manufactured by Sanwa Starch Co. Ltd.). Note that in the mixing method as described above, a dextrin having a dextrose equivalent of 10 to 13 is preferably used among such dextrins.

Examples of oligosaccharide powders for use in the mixing method include products commercially available as Cup Oligo P (galactooligosaccharide: manufactured by Nisshin Sugar Co. Ltd.) and OLIGOMATE 55NP (galactooligosaccharide: manufactured by Yakult Pharmaceutical Industry Co., Ltd.). Note that in the mixing method, a galactooligosaccharide powder is preferred and a galactooligosaccharide powder that contains, as a main component, 4'-galactosyllactose obtained by allowing β-galactosidase to act on lactose is particularly preferred among such oligosaccharides.

In the mixing method, a powder of a dextrin having a dextrose equivalent of 10 to 18, a powder of oligosaccharide, and, as needed, a powder of another component have only to be mixed with a known mixer.

Examples of dextrins having a dextrose equivalent of 10 to 18 for used in the drying method, among the methods for manufacturing the oligosaccharide powder of the present invention as described above, include products commercially available as Dextrin #100 (DE=10 to 13: Sandec series manufactured by Sanwa Starch Co. Ltd.) and Dextrin #150 (DE=15 to 18: Sandec series manufactured by Sanwa Starch Co. Ltd.). Note that, in the drying method, a dextrin having a dextrose equivalent of 10 to 13 is preferably used among such dextrins.

As an oligosaccharide for use in the drying method, a liquid sugar is preferably used. An example of such an oligosaccharide liquid sugar is a product commercially available as OLIGOMATE 55N (galactooligosaccharide: manufactured by Yakult Pharmaceutical Industry Co., Ltd.). Note that in the drying method, a galactooligosaccharide liquid sugar is preferred and a galactooligosaccharide liquid sugar containing, as a main component, 4'-galactosyllactose obtained by allowing β-galactosidase to act on lactose is particularly preferred among such oligosaccharide liquid sugars.

In the drying method, the solution that contains a dextrin having a dextrose equivalent of 10 to 18 and an oligosaccharide is simply prepared, for example, by mixing the dextrin having a dextrose equivalent of 10 to 18 and the oligosaccharide, and as needed, another component into a solvent, such as water. Note that, in the drying method, the contents and the blending ratio of the dextrin having a dextrose equivalent of 10 to 18 and the oligosaccharide are simply made to be the same as the contents and the ratio in the oligosaccharide powder of the present invention. When the sum total of the amounts of solids of the dextrin having a dextrose equivalent of 10 to 18 and the oligosaccharide in the solution is too high, drying cannot be sufficiently achieved in some cases. Thus the sum total of the amounts of solids is 8 to 47% and preferably 23 to 43% of the solution. In mixing, heat or the like may be appropriately applied by taking the solubilities into consideration.

The solution that contains a dextrin having a dextrose equivalent of 10 to 18 and an oligosaccharide prepared in the above manner is subjected to drying. The drying method is not limited as long as it is a method in which the dextrin having a dextrose equivalent of 10 to 18 and the oligosaccharide can be made into a powder form and examples include spray drying and vacuum drying. Among the drying methods, spray drying is preferred since continuous manufacturing or mass production can be achieved. The spraying technique in the spray drying may be an atomizer technique, a nozzle technique, a dual fluid nozzle technique, and the like and is not limited. The conditions include, but not limited to, a condition of an inlet temperature of 140 to 250° C. and an outlet temperature of 90 to 110° C.

In the drying method, the dried product may be subjected to an additional treatment, such as granulation or pulverization.

When a solution containing an oligosaccharide without a dextrin is dried, the solution becomes a sticky candy-like form in a drying apparatus and the recovery rate is 20% or less. Meanwhile, the method for manufacturing an oligosaccharide powder of the present invention by the drying method as described above achieves a recovery rate of an oligosaccharide powder of 70% or more and preferably 80% or more, and thus there is little wasted resources.

EXAMPLES

The present invention will be described in detail below with reference to examples, but the present invention is not to be limited to the examples.

Example 1

(1) A solution (raw solution for drying) having a solid content of 30% was prepared by mixing components shown in Table 1.

TABLE 1

| OLIGOMATE 55N* | 0.6 kg (solid content: 0.45 kg, galactooligosaccharide solid content: 0.2475 kg) |
|---|---|
| Dextrin | 0.45 kg (solid content: 0.45 kg) |
| Water | 1.95 kg |
| Total | 3.00 kg |

*Manufactured by Yakult Pharmaceutical Industry Co., Ltd. (solid content: 75%, galactooligosaccharide in the solid: 55%)

(2) The raw solution for drying prepared in the above (1) was subjected to spray drying using an atomizer-type spray drier (manufactured by GEA Process Engineering Inc.) (inlet temperature: 200° C., outlet temperature: 90 to 95° C., atomizer rotating speed: 27,000 rpm, temperature of raw solution: about 50° C., water vaporization: about 2.4 kg/hr) to obtain a powder. The powder was allowed to stand under a condition at a room temperature of 30° C. and a humidity of 60% and after prescribed time periods, working properties were evaluated according to the following criteria. The result was shown in Table 2. The dextrose equivalent (DE) of the dextrin was also shown in Table 2.

Evaluation Criteria of Working Properties

Evaluation: Explanation oo: Any lump, if generated, becomes powder by a light touch with a scoopula.

o: Any lump becomes powder by a push with a scoopula.

Δ: Any lump becomes powder by a strong push with a scoopula.

x: Any lump is solidified and does not become powder by any push of a scoopula.

TABLE 2

|  | Dextrin #100[1] | Dextrin #150[2] | Dextrin #250[3] |
|---|---|---|---|
| DE | 10 to 13 | 15 to 18 | 22 to 26 |
| 15 minutes | oo | oo | o |
| 30 minutes | o | o | Δ |
| 45 minutes | o | Δ | x |
| 60 minutes | Δ | Δ | x |
| 75 minutes | Δ | x | x |

TABLE 2-continued

|  | Dextrin #100[1] | Dextrin #150[2] | Dextrin #250[3] |
|---|---|---|---|
| 90 minutes | x | x | x |
| 120 minutes | x | x | x |
| 150 minutes | x | x | x |

[1]Sandec series manufactured by Sanwa Starch Co. Ltd.
[2]Sandec series manufactured by Sanwa Starch Co. Ltd.
[3]Sandec series manufactured by Sanwa Starch Co. Ltd.

It was found that the use of a dextrin having a DE of 10 to 18 resulted in low hydroscopic properties and good working properties.

Example 2

A raw solution for drying was prepared in the same manner as in (1) of Example 1 using each dextrin shown in Table 3. The raw solution for drying was subjected to spray drying in the same manner as in (2) of Example 1 to obtain a powder. The time taken for drying, the amount of powder product recovered, and the recovery rate of powder product (100%=900 g) in this step were determined. The results were shown in Table 3. The dextrose equivalent (DE) of the dextrin was also shown in Table 3.

TABLE 3

|  | Dextrin #100[1] | Dextrin #150[2] | Dextrin #250[3] |
|---|---|---|---|
| DE | 10 to 13 | 15 to 18 | 22 to 26 |
| Time taken for drying | 54 minutes | 54 minutes | 55 minutes |
| Amount of powder product recovered | 764 g | 745 g | 517 g |
| Recovery rate of powder product | 84.8% | 82.8% | 57.4% |

[1]Sandec series manufactured by Sanwa Starch Co. Ltd.
[2]Sandec series manufactured by Sanwa Starch Co. Ltd.
[3]Sandec series manufactured by Sanwa Starch Co. Ltd.

The use of a dextrin having a DE of 10 to 18 resulted in a high recovery rate of powder product.

Example 3

OLIGOMATE 55N (manufactured by Yakult Pharmaceutical Co. Ltd.) and a dextrin having a dextrose equivalent (DE) of 17 to 18 (manufactured by San-ei Sucrochemical Co., Ltd.) were mixed and dissolved in water to prepare raw solutions for drying having the ratios of solids of the oligosaccharide and the dextrin shown in Table 4 (solid content in the raw solution for drying: 30%, amount of solids: 2.4 kg, amount of raw solution for drying: 8 kg). The raw solutions for drying were each subjected to spray drying in the same manner as in (2) of Example 1 to obtain a powder. The time period taken for drying, the amount of powder product recovered, and the recovery rate of powder product (100%=2.4 kg) in this step were determined. The results were also shown in Table 4. Note that the oligosaccharide content and the dextrin content in Table 4 are the contents thereof in the solids in the raw solution for drying.

TABLE 4

| | Ratio of solids (oligosaccharide:dextrin) | | | | | |
|---|---|---|---|---|---|---|
| | 1:2.7 | 1:1.8 | 1:1.7 | 1:1.5 | 1:1.4 | 1:1.2 |
| Oligosaccharide content | 22% | 27.5% | 28.6% | 29.7% | 30.8% | 33% |
| Dextrin content | 60% | 50% | 48% | 46% | 44% | 40% |
| Time taken for drying | 140 min | 140 min | 140 min | 140 min | 140 min | 70 min* |
| Amount of powder product recovered | 2.1 kg | 1.82 kg | 1.78 kg | 1.76 kg | 1.74 kg | 0.2 kg |
| Recovery rate of powder product | 87.5% | 75.8% | 74.2% | 73.3% | 72.5% | 16.7% |

*The oligosaccharide powder was attached to the inside of the spray drier to fail to perform a normal operation and thus the operation was stopped at the time when a half of the raw solution for drying (amount of raw solution: 4 kg, solid content: 1.2 kg) had been treated.

A ratio of solids of oligosaccharide:dextrin in the range of 1:1.4 to 1:2.7 resulted in a high recovery rate of powder product.

Example 4

10.5 kg of whey protein concentrate, 6.2 kg of casein, 57.7 kg of lactose, 27.3 kg of vegetable oil, 1.14 kg of DHA oil, 160 g of a vitamin mixture (vitamins A, D, E, K, B1, B2, B6, B12, and C, niacin, folic acid, pantothenic acid, biotin, and inositol), and 2 kg of a mineral mixture (calcium carbonate, potassium chloride, magnesium sulfate, sodium ferrous citrate, copper sulfate, and zinc sulfate) were added to 400 liter of worm water and the mixture was homogeneously mixed and was sterilized at 121° C. for 2 seconds to obtain a formulated milk liquid. The sterilized formulated milk liquid was subjected to spray drying to obtain 100 kg of a base powder of formulated milk powder for infants. Next, a raw solution for drying was prepared in the same manner as in (1) of Example 1 using Dextrin #100 (Sandec series manufactured by Sanwa Starch Co. Ltd.). The raw solution for drying was subjected to spray drying in the same manner as in (2) of Example 1 to obtain a galactooligosaccharide powder. 2.04 kg of the obtained galactooligosaccharide powder and 100 kg of the base powder of formulated milk powder for infants were mixed to obtain a galactooligosaccharide-containing formulated milk powder for infants.

Due to the low hydroscopic properties of the galactooligosaccharide powder, the powder did not form lumps and had high working properties, and the obtained galactooligosaccharide-containing formulated milk powder for infants had no problem in terms of physical properties and other qualities.

INDUSTRIAL APPLICABILITY

The oligosaccharide powder of the present invention has high working properties and thus can be easily incorporated into various foods and drinks.

The invention claimed is:

1. An oligosaccharide powder consisting of a dextrin having a dextrose equivalent of 10 to 18 and an oligosaccharide, wherein the blending ratio of the oligosaccharide to the dextrin having a dextrose equivalent of 10 to 18 is 1:1.4 to 1:1.8.

2. The oligosaccharide powder according to claim 1, wherein the oligosaccharide is a galactooligosaccharide.

3. The oligosaccharide powder according to claim 1, wherein the oligosaccharide powder is obtained by preparing a solution that contains a dextrin having a dextrose equivalent of 10 to 18 and an oligosaccharide and subjecting the solution to drying.

4. The oligosaccharide powder according to claim 3, wherein the drying is spray drying.

5. A method for manufacturing the oligosaccharide powder according to claim 1, the method comprising:
preparing a solution that contains a dextrin having a dextrose equivalent of 10 to 18 and an oligosaccharide; and
subjecting the solution to drying.

6. The manufacturing method according to claim 5, wherein the oligosaccharide is a galactooligosaccharide.

7. The manufacturing method according to claim 5, wherein the drying is spray drying.

8. The oligosaccharide powder according to claim 1, wherein the oligosaccharide is at least one selected from the group consisting of an isomaltooligosaccharide, a xylooligosaccharide, a soybean oligosaccharide, a nigerooligosaccharide, a lactosucrose, a fructooligosaccharide, and combinations thereof.

9. The oligosaccharide powder according to claim 1, wherein the dextrin has a dextrose equivalent of 15 to 18, and wherein the blending ratio of the oligosaccharide to the dextrin having a dextrose equivalent of 15 to 18 is 1:1.4 to 1:1.8.

10. The oligosaccharide powder according to claim 1, wherein the dextrin has a dextrose equivalent of 10 to 13, and wherein the blending ratio of the oligosaccharide to the dextrin having a dextrose equivalent of 10 to 13 is 1:1.4 to 1:1.8.

* * * * *